United States Patent
Huestis

(10) Patent No.: US 8,225,305 B2
(45) Date of Patent: Jul. 17, 2012

(54) DELIVERING SOFTWARE PRODUCT UPDATES VIA A RESPONSE FILE

(75) Inventor: Jonathan M. Huestis, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 1323 days.

(21) Appl. No.: 11/866,097

(22) Filed: Oct. 2, 2007

(65) Prior Publication Data

US 2009/0089773 A1 Apr. 2, 2009

(51) Int. Cl.
G06F 9/44 (2006.01)
G06F 9/445 (2006.01)

(52) U.S. Cl. ......... 717/173; 717/122; 717/170; 717/178

(58) Field of Classification Search .................. 717/173
See application file for complete search history.

(56) References Cited

U.S. PATENT DOCUMENTS

| | | | | |
|---|---|---|---|---|
| 5,832,520 A * | 11/1998 | Miller | ............................... | 1/1 |
| 5,867,713 A * | 2/1999 | Shrader et al. | ............... | 717/176 |
| 6,167,567 A * | 12/2000 | Chiles et al. | .................. | 717/173 |
| 6,438,749 B1 * | 8/2002 | Chamberlain | ................ | 717/174 |
| 7,886,287 B1 * | 2/2011 | Davda | ........................... | 717/168 |

OTHER PUBLICATIONS

Brunce et al., "Strategy for Supporting CM/2 and DB/2 with IBM LAN NetView Start 1.1", Apr. 1, 1994, IBM TDB, vol. 37, Issues 4B, pp. 325-328.*
Segal, M.E.; Frieder, O.; , "On-the-fly program modification: systems for dynamic updating," Software, IEEE , vol. 10, No. 2, pp. 53-65, Mar. 1993, doi: 10.1109/52.199735.*

* cited by examiner

Primary Examiner — James D Rutten
(74) Attorney, Agent, or Firm — Yudell Isidore Ng Russell PLLC

(57) ABSTRACT

A method, system, and computer program product for efficiently providing software product updates in a client's computer system. A Software Product Update (SPU) utility initiates the software update process by downloading a response file. The response file comprises scripted code and encoded data for an update of application system files. The SPU utility processes the response file with the aid of a script processing engine (SPE), which is saved, along with installation files, on the client's computer system during an initial software product installation. The SPU utility sets the installation properties within the installation file set to values which allow the SPE to access and run the scripted code. The embedded binary data is decoded with the aid of the running scripted code. The SPU utility completes the update of application system files and the installation properties file, with the aid of the decoded embedded data.

12 Claims, 4 Drawing Sheets

DELIVERING SOFTWARE PRODUCT UPDATES VIA A RESPONSE FILE

BACKGROUND

1. Technical Field

The present invention generally relates to computer software systems and in particular to an updating facility for computer software.

2. Description of the Related Art

Traditionally, software fixes/updates to products already released to customers are livered by creating a refresh of the base image or via fix pack installers. Some products also have the capability of creating a new image by combining the base install plus cumulative fixes to create a new installer. Either process requires the maintenance of code and incurs costs for testing, translation and media. Consequently, a significant amount of resources are consumed. These installations also tend to be extremely large compared to the changes that are needed to address the actual product issue(s).

SUMMARY OF ILLUSTRATIVE EMBODIMENTS

Disclosed are a method, system, and computer program product for efficiently providing software product updates in a client's computer system. A Software Product Update (SPU) utility initiates the software update process by downloading a response file. The response file comprises scripted code and encoded data for an update of application system files. The SPU utility processes the response file with the aid of a script processing engine (SPE), which is saved, along with installation files, on the client's computer system during an initial software product installation. The SPU utility sets the installation properties within the installation file set to values which allow the SPE to access and run the scripted code. The embedded binary data is decoded with the aid of the running scripted code. The SPU utility completes the update of application system files and the installation properties file, with the aid of the decoded embedded data.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

Figure 1:
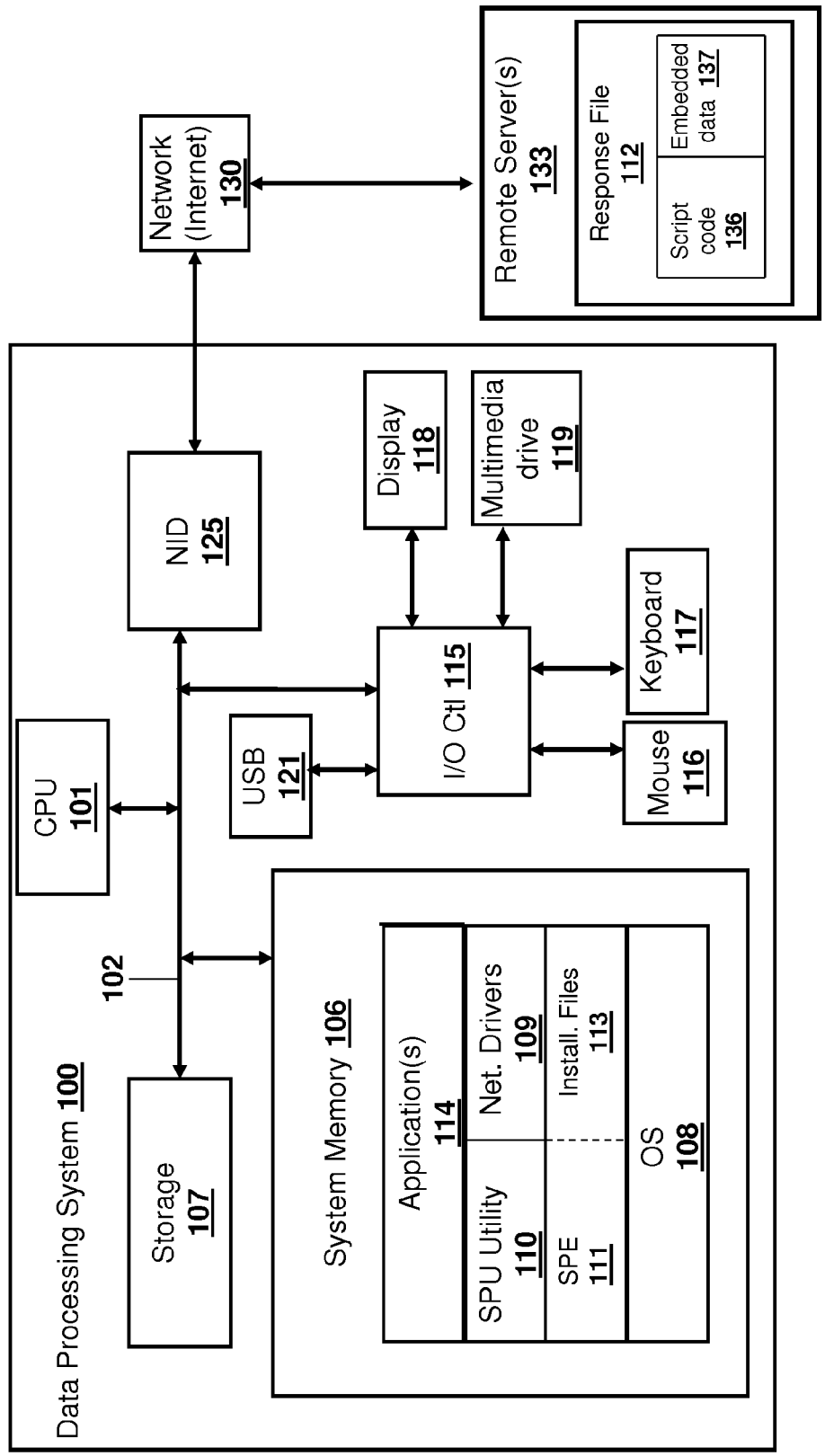
FIG. 1 is a block diagram representation of a data processing system, according to one embodiment of the invention.

The illustrative embodiments provide a method, system, and computer program product for efficiently providing software product updates in a client's computer system. A Software Product Update (SPU) utility initiates the software update process by downloading a response file. The response file comprises scripted code and encoded data for an update of application system files. The SPU utility processes the response file with the aid of a script processing engine (SPE), which is saved, along with installation files, on the client's computer system during an initial software product installation. The SPU utility sets the installation properties within the installation file set to values which allow the SPE to access and run the scripted code. The embedded binary data is decoded with the aid of the running scripted code. The SPU utility completes the update of application system files and the installation properties file, with the aid of the decoded embedded data.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g, 1xx for FIGS. 1 and 2xx for FIG. 2). The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized.

With reference now to the figures, FIG. 1, there is depicted a block diagram representation of a data processing system (and connected network). DPS 100 comprises at least one processor or central processing unit (CPU) 101 connected to system memory 106 via system interconnect/bus 102. Also connected to system bus 102 is I/O controller 115, which provides connectivity and control for input devices, of which pointing device (or mouse) 116 and keyboard 117 are illustrated, and output devices, of which display 118 is illustrated. Additionally, a multimedia drive 119 (e.g., CDRW or DVD drive) and USB (universal serial bus) hub 121 are illustrated, coupled to I/O controller. Multimedia drive 119 and USB hub 121 may operate as both input and output (storage) mechanisms. DPS 100 also comprises storage 107, within which data/instructions/code may be stored.

DPS 100 is also illustrated with a network interface device (NID) 125, with which DPS 100 connects to one or more servers 133 via an access network, such as the Internet 130. In the described embodiments, Internet 130 is a worldwide collection of networks and gateways that utilize the Transmission Control Protocol/Internet Protocol (TCP/IP) suite of protocols to communicate with one another. Of course, network access may also be provided via a number of different types of networks, such as an intranet, a local area network (LAN), a virtual private network (VPN), or other wide area network (WAN) other than the Internet, for example.

Notably, in addition to the above described hardware components of DPS 100, various features of the invention are completed via software (or firmware) code or logic stored within memory 106 or other storage (e.g., storage 107) and executed by CPU 101. Thus, illustrated within memory 106 are a number of software/firmware components, including operating system (OS) 108 (e.g., Microsoft Windows®, a trademark of Microsoft Corp, or GNU®/Linux®, registered trademarks of the Free Software Foundation and The Linux Mark Institute), applications 114, and software product update (SPU) utility 110. In actual implementation, applications 114 and SPU utility 110 may be combined as a single application collectively providing the various functions of each individual software component when the corresponding code is executed by the CPU 101. For simplicity, SPU utility 110 is illustrated and described as a stand alone or separate software/firmware component, which provides specific functions, as described below.

CPU 101 executes SPU utility 110 as well as OS 108, which supports the user interface features of SPU utility 110. In the illustrative embodiment, SPU utility 110 generates/provides several graphical user interfaces (GUI) to enable user interaction with, or manipulation of, the functional features of the utility (110). Among the software code/instructions provided by SPU utility 110, and which are specific to the invention, are: (a) code for saving a set of installation files along with a software processing engine (SPE) within a client computer system; (b) code for downloading a response file which comprises the scripted code and encoded date which are both used to execute the software update; and (c) code for updating application system files and the installation properties file. For simplicity of the description, the collective body of code that enables these various features is referred to herein as SPU utility 110. According to the illustrative embodiment, when CPU 101 executes SPU utility 110, DPS 100 initiates a series of functional processes that enable the above functional features as well as additional features/functionality, which are described below within the description of FIGS. 2-4.

Those of ordinary skill in the art will appreciate that the hardware and basic configuration depicted in FIG. 1 may vary. For example, other devices/components may be used in addition to or in place of the hardware depicted. The depicted example is not meant to imply architectural limitations with respect to the present invention. The data processing system depicted in FIG. 1 may be, for example, an IBM eServer pSeries system, a product of International Business Machines Corporation in Armonk, N.Y., running the Advanced Interactive Executive (AIX) operating system or LINUX operating system.

Figure 2:
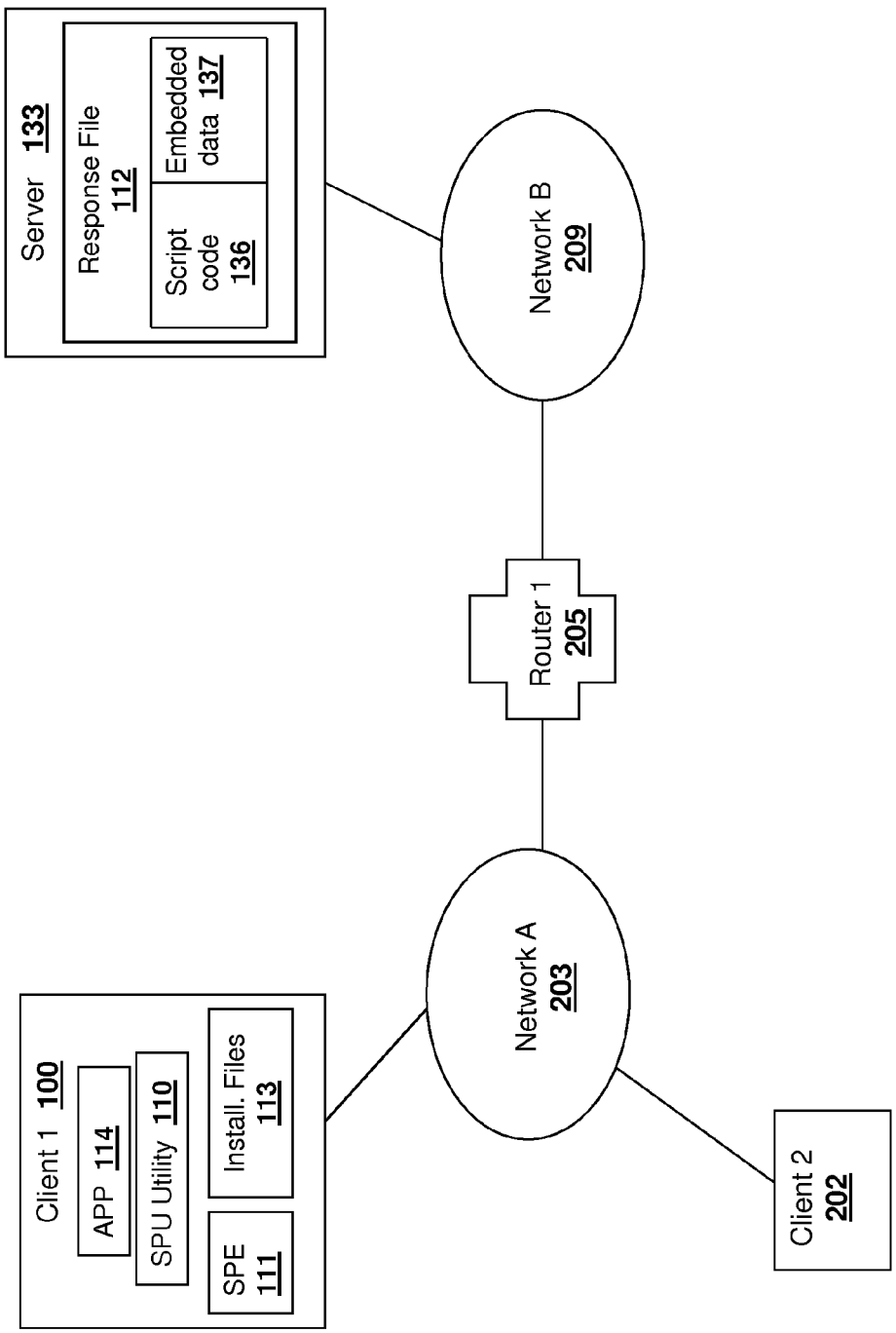
FIG. 2 illustrates a network, in which a client updates application system files by processing a response file downloaded from a server, in accordance with one embodiment of the invention.

With reference now to FIG. 2, a network in which a client runs an application and receives application software updates from a server via a response file, is illustrated, according to an illustrative embodiment of the present invention. Network 200 comprises client 1 100 and client 2 202 which both connect to network A 203. Client 1 100 comprises APP 114 and SPU utility 110. Client 1 100 also comprises installation files 113 and Software Processing Engine (SPE) 111. Network 200 also comprise network B 209, which is connected to network A 203 via router 1 205. Connected to network B 209 is APP server 133. APP server 133 comprises response file 112. Response file 112 comprises script code 136 and embedded data 137.

In network 200, SPU utility 110 initiates an update of the system files of application 114 within client 1 100 by downloading response file 112 from APP server 133. SPU utility 110 processes response file 112 with the aid of script processing engine (SPE) 111, which is saved, along with installation files 113, within client 1 100 during an initial software product installation. SPU utility 110 sets the installation properties within installation file (set) 113 to values which allow the SPE 111 to access and run the scripted code. Embedded binary data 137 is decoded with the aid of the running scripted code 136. SPU utility 110 completes the update of application system files and the installation properties file, with the aid of the decoded embedded data. The update may take place via a predetermined injection point. The injection point is a place within the software that may accept a specific type of input. For flexibility, existing properties may be used as injection points using techniques similar to the techniques employed in a structured query language (SQL) injection attack. One skilled in the art will understand and is familiar with the employment of an injection point for the purpose of injecting code into a software product.

Figure 3:
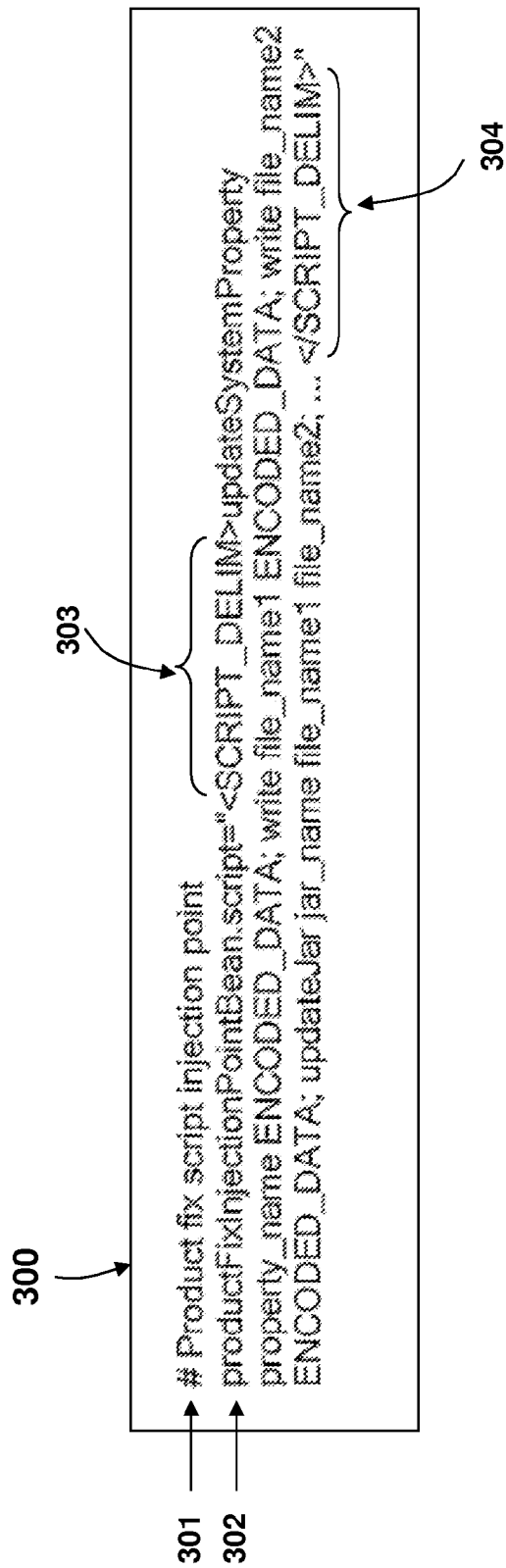
FIG. 3 illustrates an example response file, according to one embodiment of the invention.

FIG. 3 illustrates an example response file, according to one embodiment of the invention. Response file 300 comprises comment line 301 and script name 302. Response file 300 also comprises first (opening) script delimiter 303 and second (closing) script delimiter 304 which both enclose the script code.

A response file (e.g., response file 300) is a text file which includes code for one or more updates of a set of application system files and data. In addition, the response file includes a set of configuration and set up parameters to guide a customized installation. In response file 300, the scripted code and the encoded data, which are used to provide software updates and fixes, is enclosed between first (opening) script delimiter 303 and second (closing) script delimiter 304. In order for the software update process to proceed, SPU utility 110 initiates the processing of the response file by the installation file set. SPU utility 110 retrieves a set of configuration keywords and parameters from the response file. SPU utility 110 then applies the set of configuration keywords and parameters to the installation update process by setting the installation properties within the installation file set to values which allow the SPE to access the scripted logic and encoded data.

Figure 4:
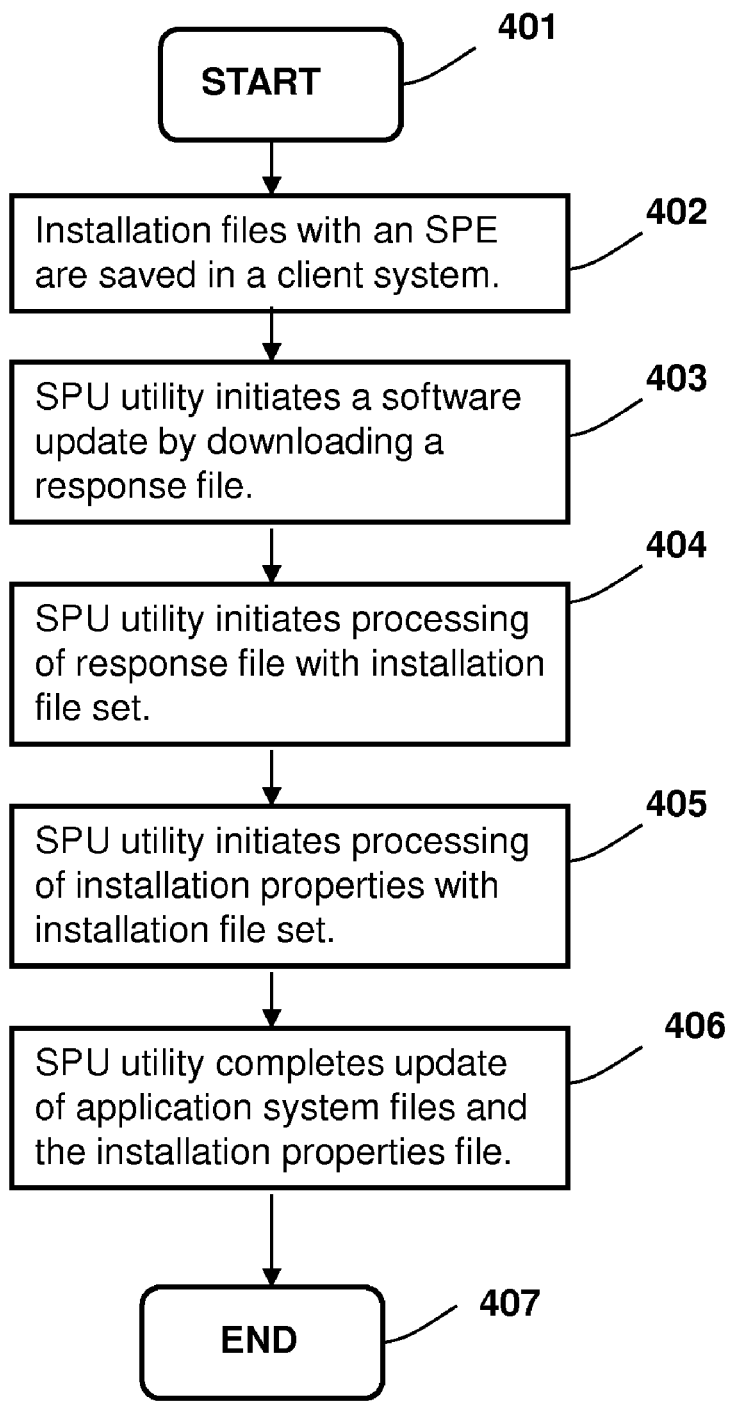
FIG. 4 is a flow chart illustrating the process of providing application software updates via a response file, in accordance with one embodiment of the invention.

FIG. 4 is a flow chart illustrating a method by which the above processes of the illustrative embodiments are completed. Although the methods illustrated in FIG. 4 may be described with reference to components shown in FIGS. 1-3, it should be understood that this is merely for convenience and alternative components and/or configurations thereof can be employed when implementing the various methods. Key portions of the methods may be completed by SPU utility 110 executing within DPS 100 (FIG. 1) and controlling specific operations of/on DPS 100, and the methods are thus described from the perspective of either/both SPU utility 110 and DPS 100.

The process of FIG. 4 begins at initiator block 401 and proceeds to block 402, at which installation files along with a script processing engine (SPE) are saved in a client system. The SPE includes one or more of the following: (1) a set of scripting constructs to accept encoded binary data, process encoded binary data and update system files and properties; and (2) a facility to process installation properties.

At block 403, SPU utility 110 initiates the software update by downloading a response file. The response file is a text file which includes code for one or more updates of a set of application system files and data. In addition, the response file includes a set of configuration and set up parameters to guide a customized installation.

In a first embodiment, a tool executing on the server side performs a comparison (either on the fly or immediately after a build has been created) to determine when/what downloads are actually required. In this manner, the SPU utility does not have to download the builds to generate the response file, which substantially reduces the size of the download. In one alternative embodiment, SPU utility 110 may download a set of files for automatically generating the response file. In order to automatically generate the response file, a first set of product files from a current build is compared to a second set of product files from a release build. Consequently, a set of file differences between the current build and the release build is obtained. SPU utility 110 automatically translates the set of file differences into a set of script code and encoded data. SPU utility 110 then adds the set of script code and encoded data to the response file.

At block 404, SPU utility 110 initiates the processing of the response file by the installation file set. SPU utility 110 retrieves a set of configuration keywords and parameters from the response file. SPU utility 110 then applies the set of configuration keywords and parameters to the installation update process by setting the installation properties within the installation file set to values which allow the SPE to access the scripted logic and encoded data.

At block 405, SPU utility 110 initiates the processing of the installation properties by the installation file set. SPU utility 110 passes the scripted code to the SPE in order for the SPE to run the scripted code, in accordance with the values of the installation properties. Then SPU utility 110 initiates the decoding of the embedded binary data with the aid of the scripted code.

At block 406, SPU utility 110 completes the update of a set of application system files and the installation properties file, with the aid of the processed and decoded embedded data. The update may take place via a pre-determined injection point. The injection point is a place within the software that may accept a specific type of input. For flexibility, existing properties may be used as injection points using techniques similar to the techniques employed in a structured query language (SQL) injection attack. One skilled in the art will understand and is familiar with the employment of an injection point for the purpose of injecting code into a software product. The process ends at block 407.

In the flow charts above, one or more of the methods are embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. By way of example, a non exclusive list of types of media, includes recordable type (tangible) media such as floppy disks, thumb drives, hard disk drives, CD ROMs, DVDs, and transmission type media such as digital and analogue communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. In a data processing system which includes a software application, installation files for the software application, and a script processing engine (SPE) to facilitate software updates, a method comprising:

storing, in a client system, a set of installation files for a software application and a script processing engine (SPE) which includes one or more of:
  a set of scripting constructs to accept encoded binary data, process encoded binary data and update system files and properties; and
  a facility to process installation properties;

the client system initiating updating of the software application, wherein the updating comprises initiating a server computer system to perform an on-the-fly comparison of a first set of files of a current program build of the software application with a second set of files of a release build of the software application at a server computer system to determine a set of file differences;

downloading a response file generated at the server computer system to the client system, the response file including code for one or more updates of a set of application system files and data, the data including a set of configuration keywords and parameters to guide a customized installation, wherein the response file includes only one or more select downloads based on the set of file differences;

the client system processing the response file by the sets of installation files;

processing the installation properties by the sets of installation files; and updating, via a pre-determined code injection point, a set of application system files and an installation properties file, with the aid of the processed and decoded embedded data.

2. The method of claim 1, wherein the downloading the response file further comprises:

the client system automatically translating the set of file differences into a set of script code and encoded data; and adding the set of script code and encoded data to the response file, which also includes the set of configuration keywords and parameters to guide a customized installation.

3. The method of claim 1, wherein processing the response file further comprises:

retrieving the set of configuration keywords and parameters from the response file; and setting the installation properties within the installation file set to values which allow the SPE to access a scripted logic and encoded data, according to the set of configuration keywords and parameters from the response file.

4. The method of claim 3, wherein processing the installation properties further comprises:

passing the scripted logic to the SPE in order for the SPE to run the scripted logic, using values of the installation properties; and decoding the encoded binary data with the aid of the scripted logic.

5. A data processing system comprising:

a processor;

a memory system;

a network connection to one or more server computer systems;

a utility executing on the processor that:

stores, in a client system, a set of installation files for a software application and a script processing engine (SPE) which includes one or more of:

a set of scripting constructs to accept encoded binary data, process encoded binary data and update system files and properties; and a facility to process installation properties;

initiates an updating of the software application, wherein the updating comprises initiating a server computer system to perform an on the fly comparison of a first set of files of a current program build of the software application with a second set of files of a release build of the software application at a server computer system to determine a set of file differences;

downloads a response file generated at the server computer system to the client system, the response file including code for one or more updates of a set of application system files and data, the data including a set of configuration keywords and parameters to guide a customized installation, wherein the response file includes only one or more select downloads based on the set of file differences;

processes the response file by the sets of installation files;

processes the installation properties by the sets of installation files; and updates, via a pre-determined code injection point, a set of application system files and an installation properties file, with the aid of the processed and decoded embedded data.

6. The system of claim 5, wherein the downloading the response file further comprises:

automatically translates the set of file differences into a set of script code and encoded data; and adds the set of script code and encoded data to the response file, which also includes the set of configuration keywords and parameters to guide a customized installation.

7. The system of claim 5, wherein processing the response file further comprises:

retrieves the set of configuration keywords and parameters from the response file; and sets the installation properties within the installation file set to values which allow the SPE to access a scripted logic and encoded data, according to the set of configuration keywords and parameters from the response file.

8. The system of claim 7, wherein processing the installation properties further comprises:

passes the scripted logic to the SPE in order for the SPE to run the scripted logic, using values of the installation properties; and decodes the encoded binary data with the aid of the scripted logic.

9. A computer program product comprising:

a machine readable storage device; and program code on the machine readable storage device that when executed by a data processing system performs the functions of:

storing, in a client system, a set of installation files for a software application and a script processing engine (SPE) which includes one or more of:

a set of scripting constructs to accept encoded binary data, process encoded binary data and update system files and properties;

a facility to process installation properties;

the client system initiating updating of the software application, wherein the updating further comprises initiating a server computer system to perform an on the fly comparison of a first set of files of a current program build of the software application with a second set of files of a release build of the software application at a server computer system to determine a set of file differences;

downloading a response file generated at the server computer system to the client system, the response file including code for one or more updates of a set of application system files and data, the data including a set of configuration keywords and parameters to guide a customized installation, wherein the response file includes only one or more select downloads based on the set of file differences;

the client system processing the response file by the sets of installation files;

processing the installation properties by the sets of installation files; and updating, via a code injection point, a set of application system files and an installation properties file, with the aid of the processed and decoded embedded data.

10. The computer program product of claim 9, wherein the code for downloading the response file further comprises code for:

automatically translating the set of file differences into a set of script code and encoded data; and adding the set of script code and encoded data to the response file, which also includes the set of configuration keywords and parameters to guide a customized installation.

11. The computer program product of claim 9, wherein the code for processing the response file further comprises code for:

retrieving the set of configuration keywords and parameters from the response file; and setting the installation properties within the installation file set to values which allow the SPE to access a scripted logic and encoded data, according to the set of configuration keywords and parameters from the response file.

12. The computer program product of claim 11, wherein the code for processing the installation properties file further comprises code for:

passing the scripted logic to the SPE in order for the SPE to run the scripted logic, using values of the installation properties; and decoding the encoded binary data with the aid of the scripted logic.

* * * * *